US006766724B2

(12) United States Patent
Bernardelle et al.

(10) Patent No.: US 6,766,724 B2
(45) Date of Patent: Jul. 27, 2004

(54) SHEARING-STRIPPING MACHINE FOR ELECTRIC CABLES

(75) Inventors: Roberto Bernardelle, San Vito Di Leguzzano (IT); Valentino Marchioro, Malo (IT); Mario Casella, Schio (IT)

(73) Assignee: Samec Divisione Costruzione Macchine SRL, Schio (IT)

( * ) Notice: Subject to any disclaimer, the term of this patent is extended or adjusted under 35 U.S.C. 154(b) by 38 days.

(21) Appl. No.: 10/136,487

(22) Filed: May 2, 2002

(65) Prior Publication Data
US 2002/0166236 A1 Nov. 14, 2002

(30) Foreign Application Priority Data
May 10, 2001 (IT) ....................... VI2001A0105

(51) Int. Cl.[7] ................................. B26D 1/00
(52) U.S. Cl. ..................... 83/861; 83/947; 81/9.41; 29/33 F; 29/564.4
(58) Field of Search ............. 83/861, 947, 13; 81/9.4, 9.41, 9.51; 29/564.7, 564.4, 33 F, 868

(56) References Cited

U.S. PATENT DOCUMENTS

| | | | |
|---|---|---|---|
| 3,612,111 A | * 10/1971 | Meyer | 140/1 |
| 4,185,522 A | 1/1980 | Reinertz et al. | 81/9.51 |
| 4,188,702 A | * 2/1980 | Herbert | 29/426.6 |
| 4,584,912 A | * 4/1986 | Gudmestad et al. | 81/9.51 |
| 4,811,633 A | 3/1989 | Bueschel et al. | 81/9.51 |
| 5,067,379 A | * 11/1991 | Butler et al. | 83/13 |
| 5,398,573 A | * 3/1995 | Wollermann | 81/9.51 |
| 5,412,856 A | * 5/1995 | Nazerian et al. | 29/33 M |
| 5,445,051 A | 8/1995 | Carpenter et al. | 81/9.51 |
| 5,526,717 A | * 6/1996 | Koch | 81/9.51 |
| 5,561,899 A | 10/1996 | Carpenter et al. | 29/825 |
| 5,797,299 A | * 8/1998 | Long, Jr. | 81/9.51 |
| 5,934,161 A | * 8/1999 | Keene | 81/9.51 |
| 6,311,600 B1 | * 11/2001 | Lo et al. | 83/861 |
| 6,554,991 B1 | * 4/2003 | Goodman et al. | 204/613 |

* cited by examiner

Primary Examiner—Allan N. Shoap
Assistant Examiner—Phong Nguyen
(74) Attorney, Agent, or Firm—Dykema Gossett PLLC

(57) ABSTRACT

A shearing-stripping machine (1) for electric cables (C) is disclosed, comprising a casing (2) on which the following elements are mounted: driving means (5) to advance the cable (C) to be shorn and stripped, at least a shearing and stripping unit (3) provided with first blades (18, 19) for shearing the cable (C), incising the sheath (C1) and stripping the cable (C) and second blades (42, 43) for incising the sheaths (F1) of the wires (F) constituting the cable (C) and stripping said wires (F); an alignment unit (4) of said wires (F) before incision of the sheaths (F1); driving means (34) for moving the blades (18, 19; 42, 43); at least a control and actuation microprocessor unit (8). The driving means (34) comprise a single motor (35) coupled to a mechanism (34a) to which adjustable stop means (80, 81) of the stroke of the second blades (42, 43) are associated.

18 Claims, 17 Drawing Sheets

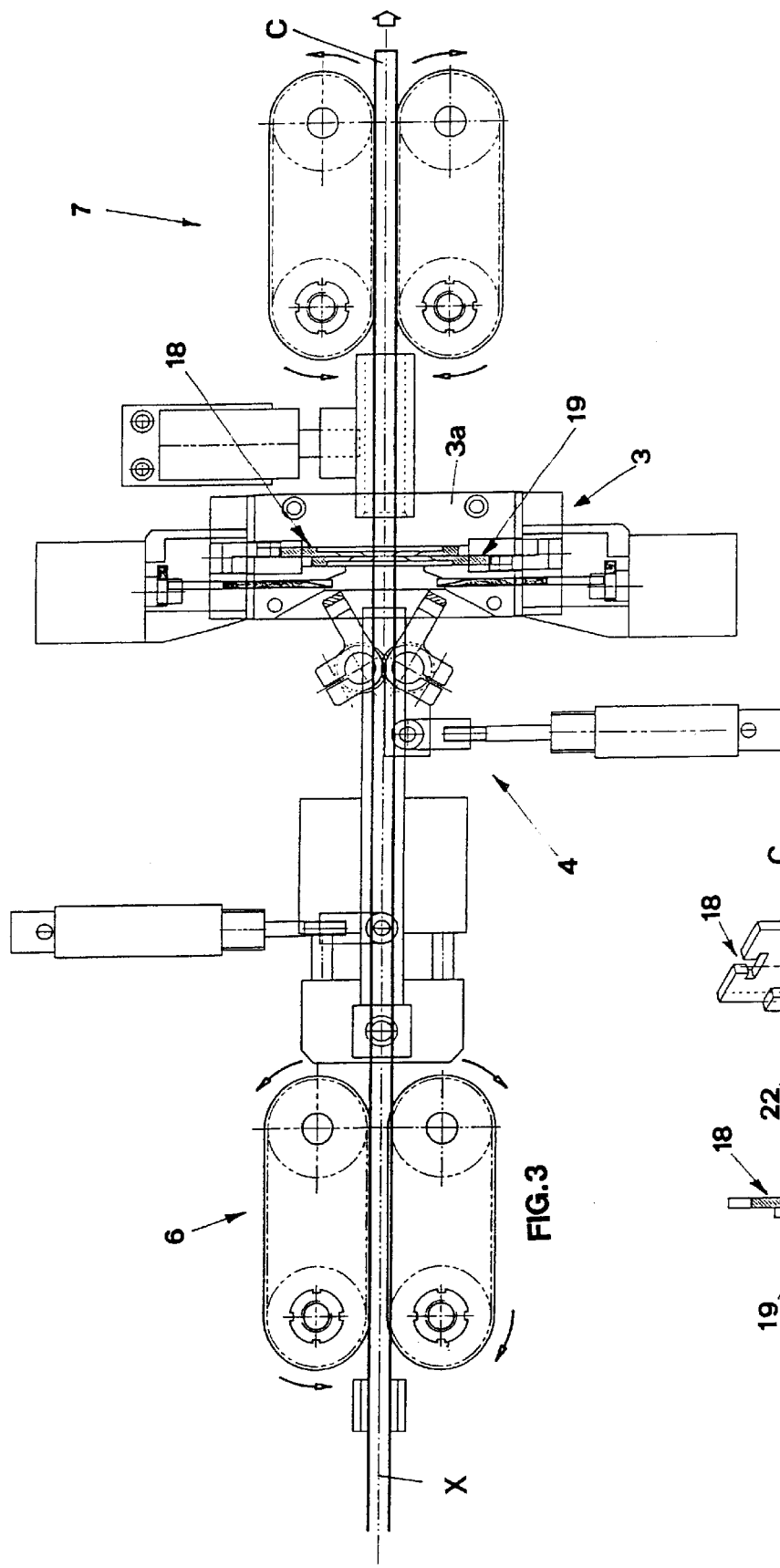
FIG.3
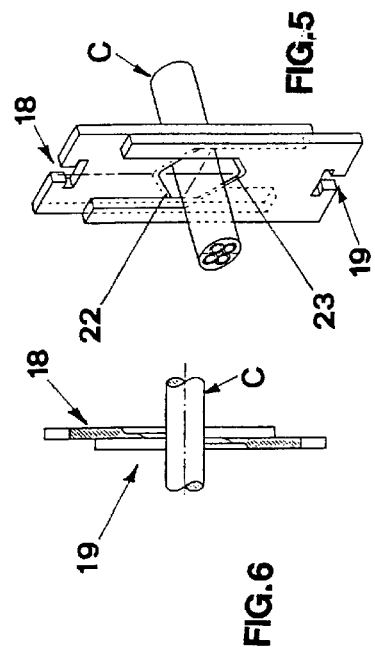
FIG.5
FIG.6

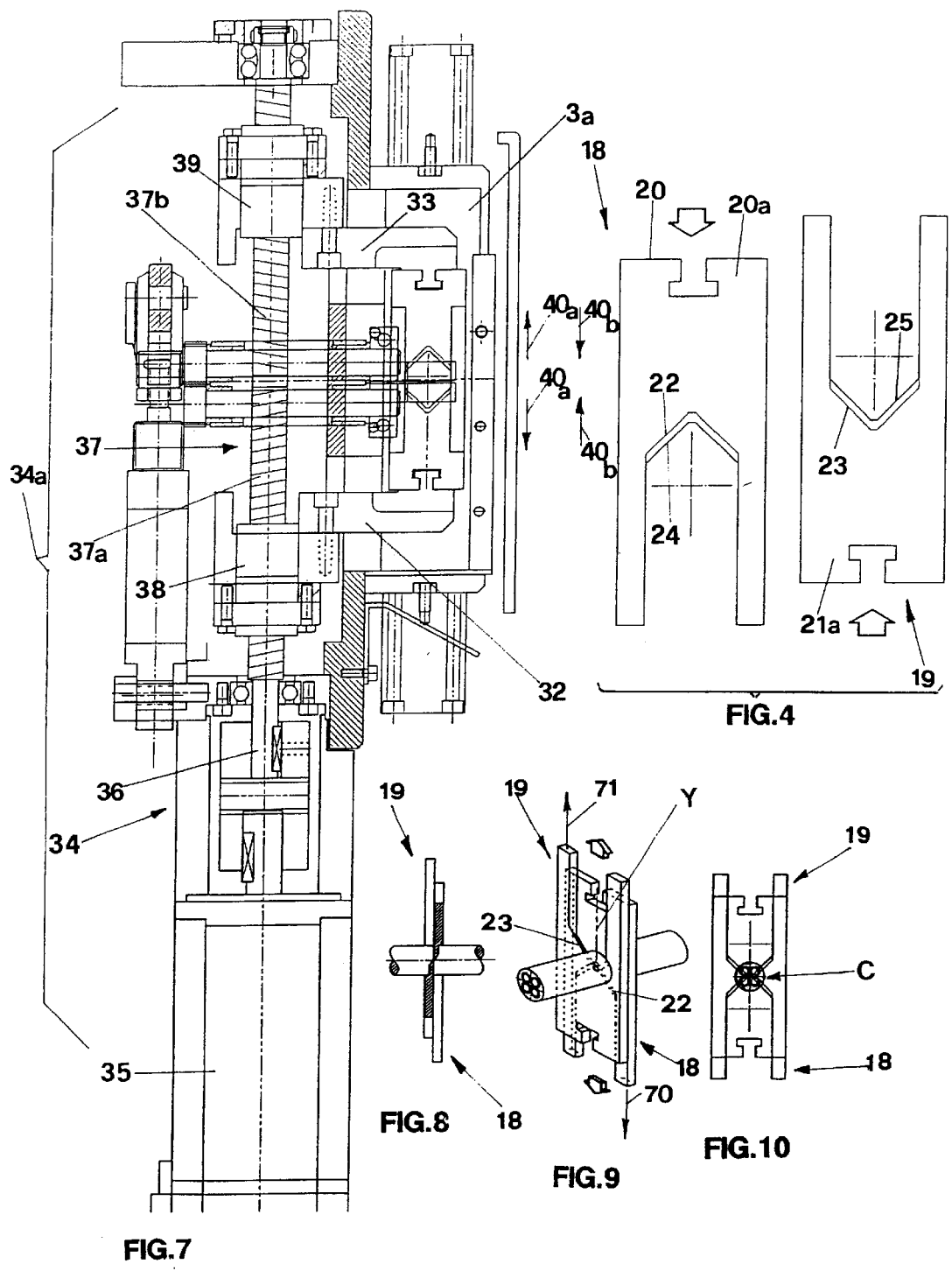

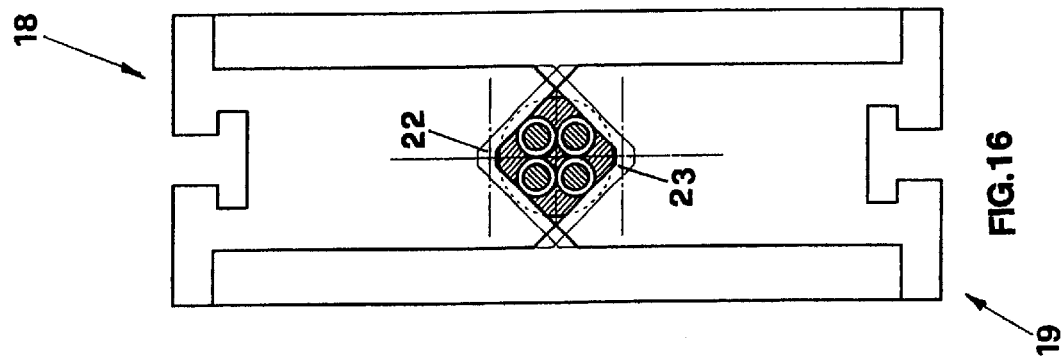
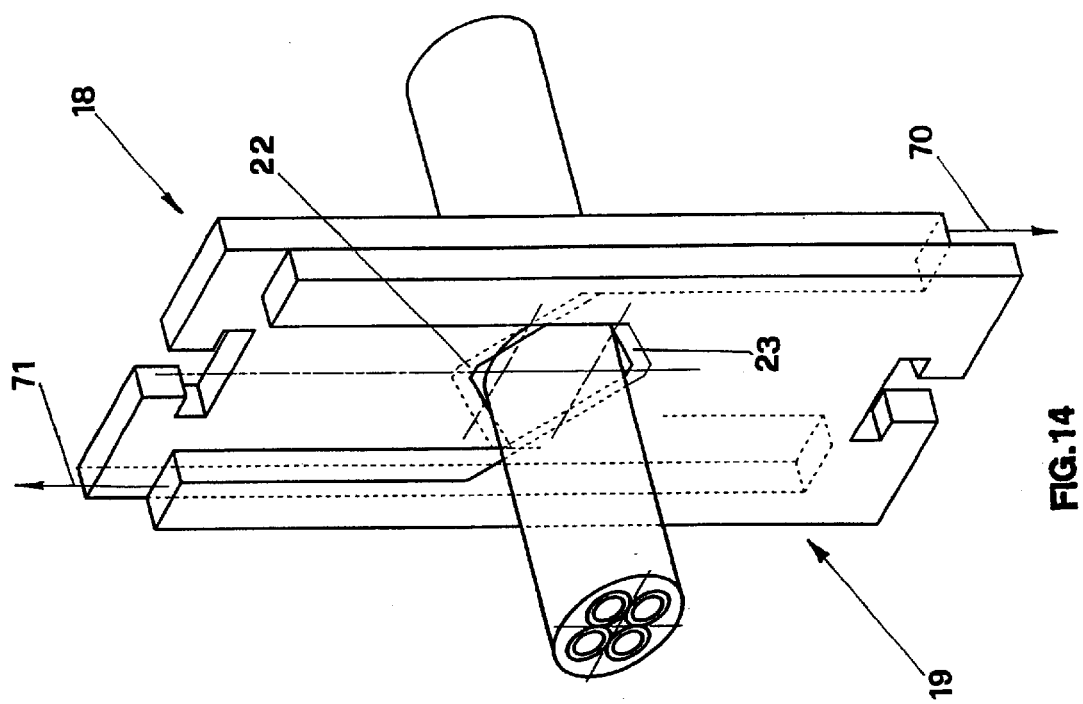
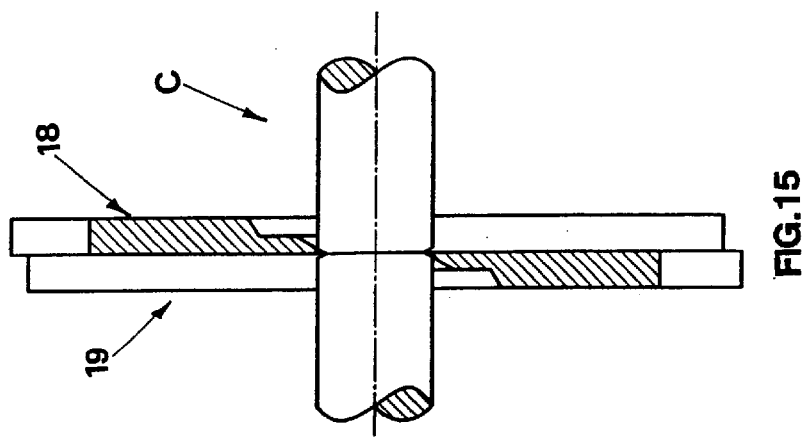

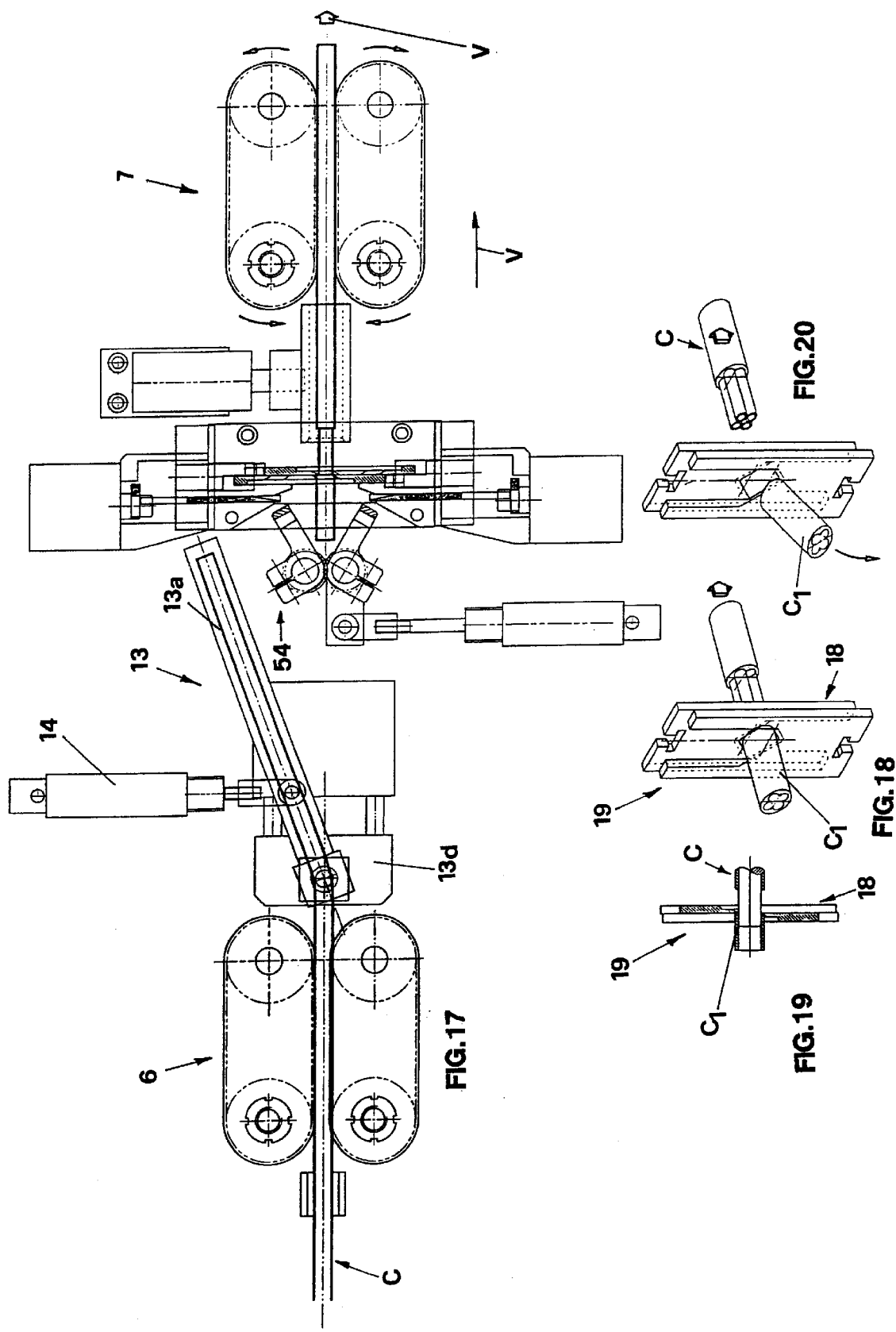

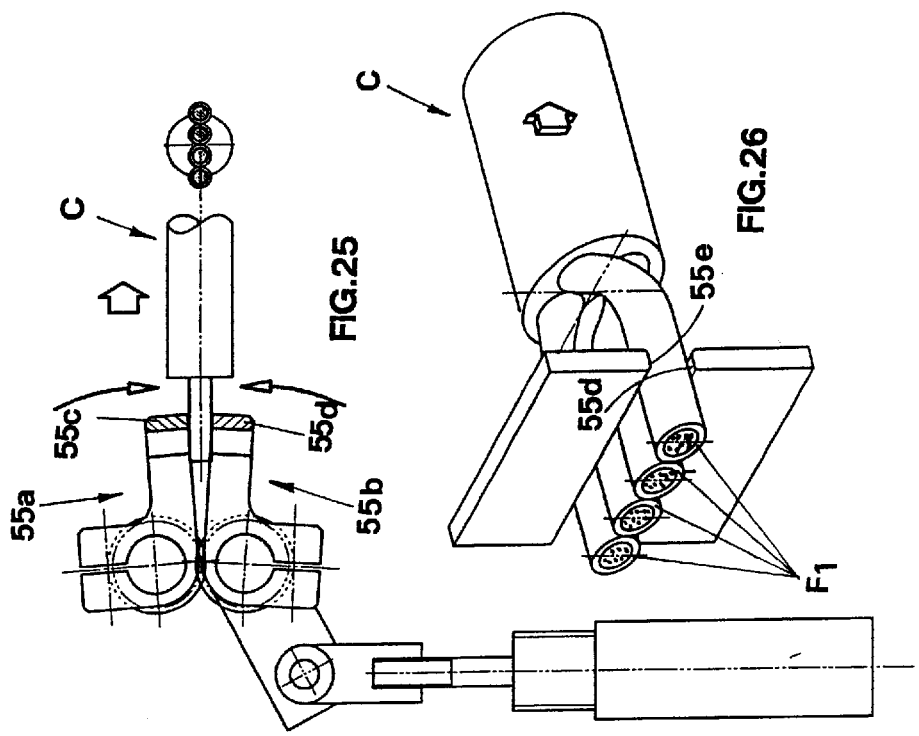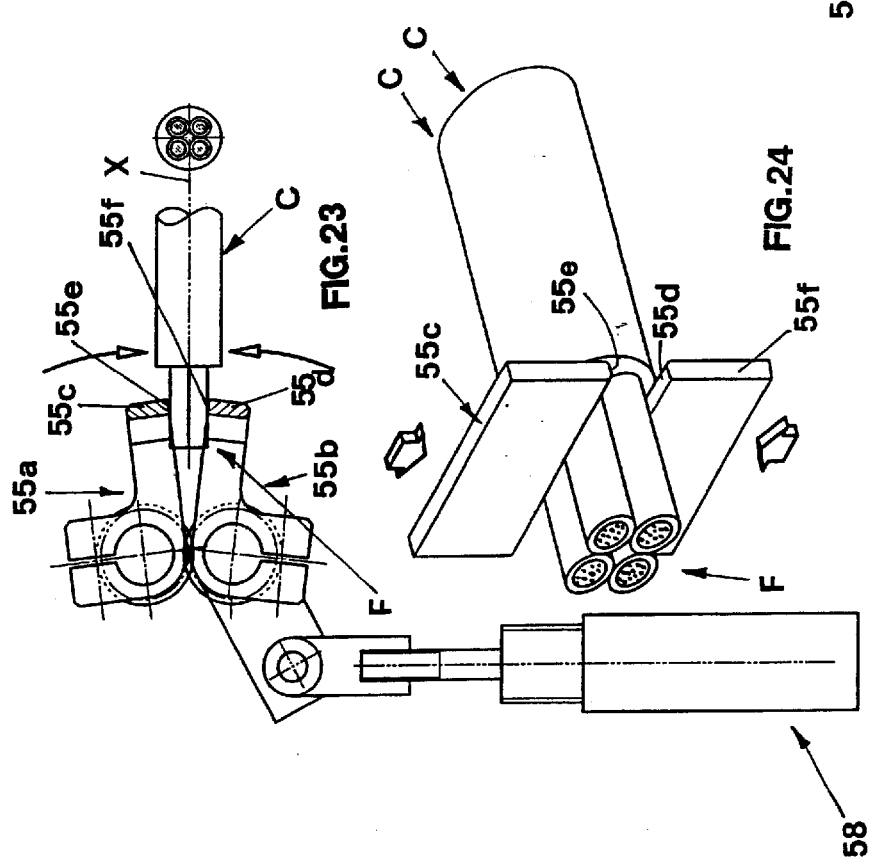

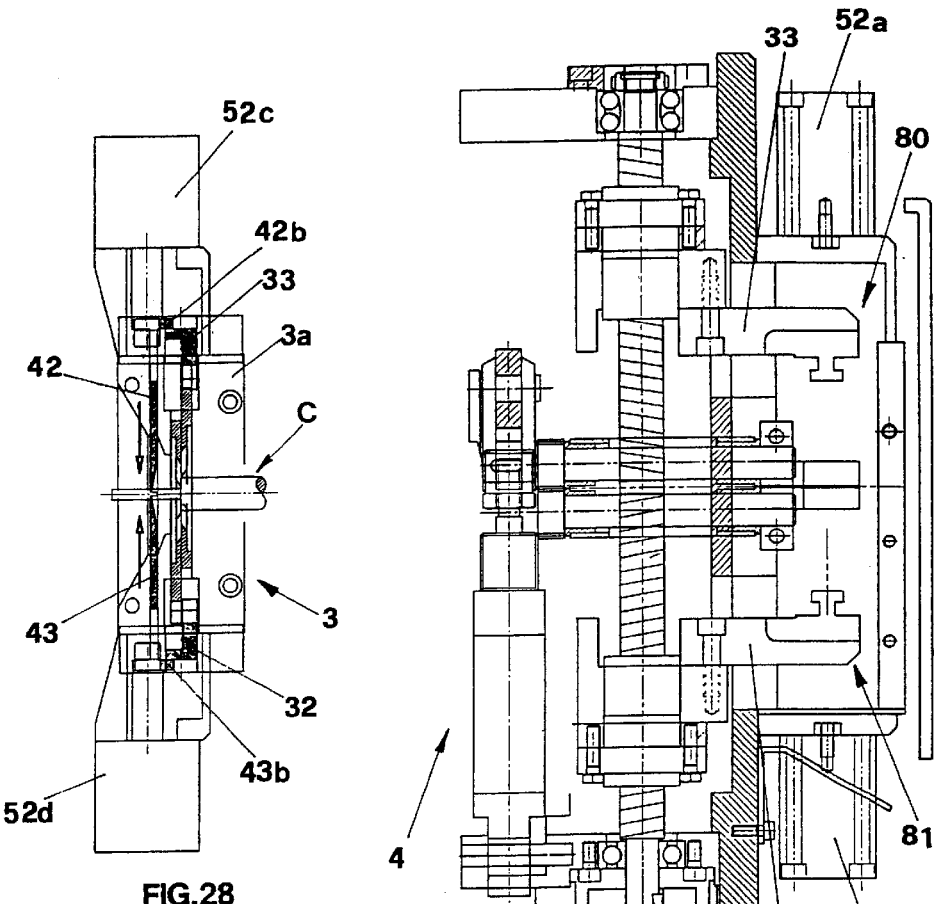
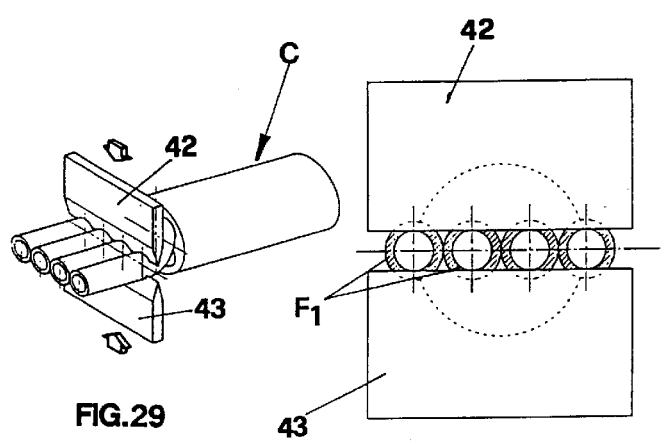
FIG.28
FIG.29
FIG.30
FIG.27

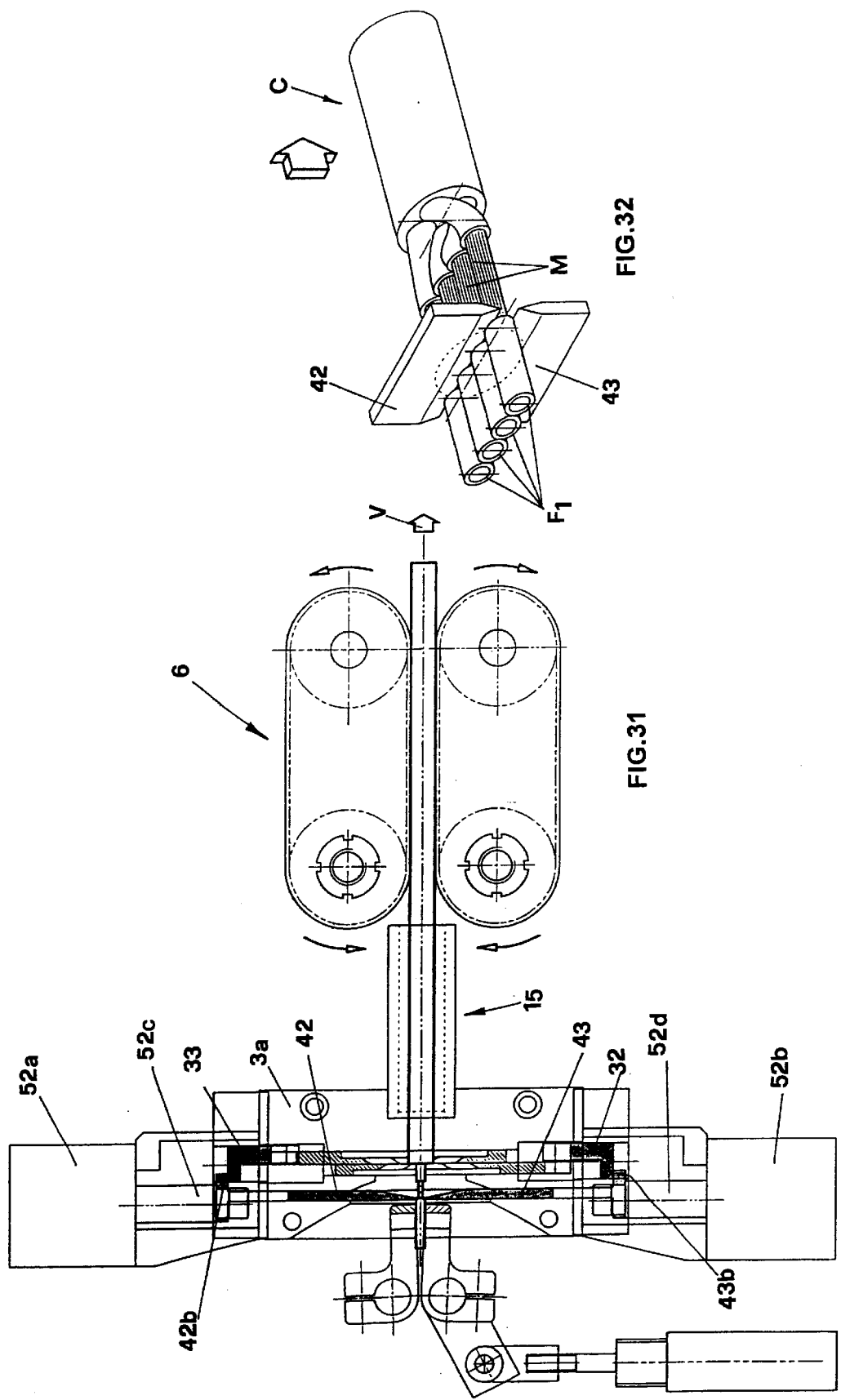

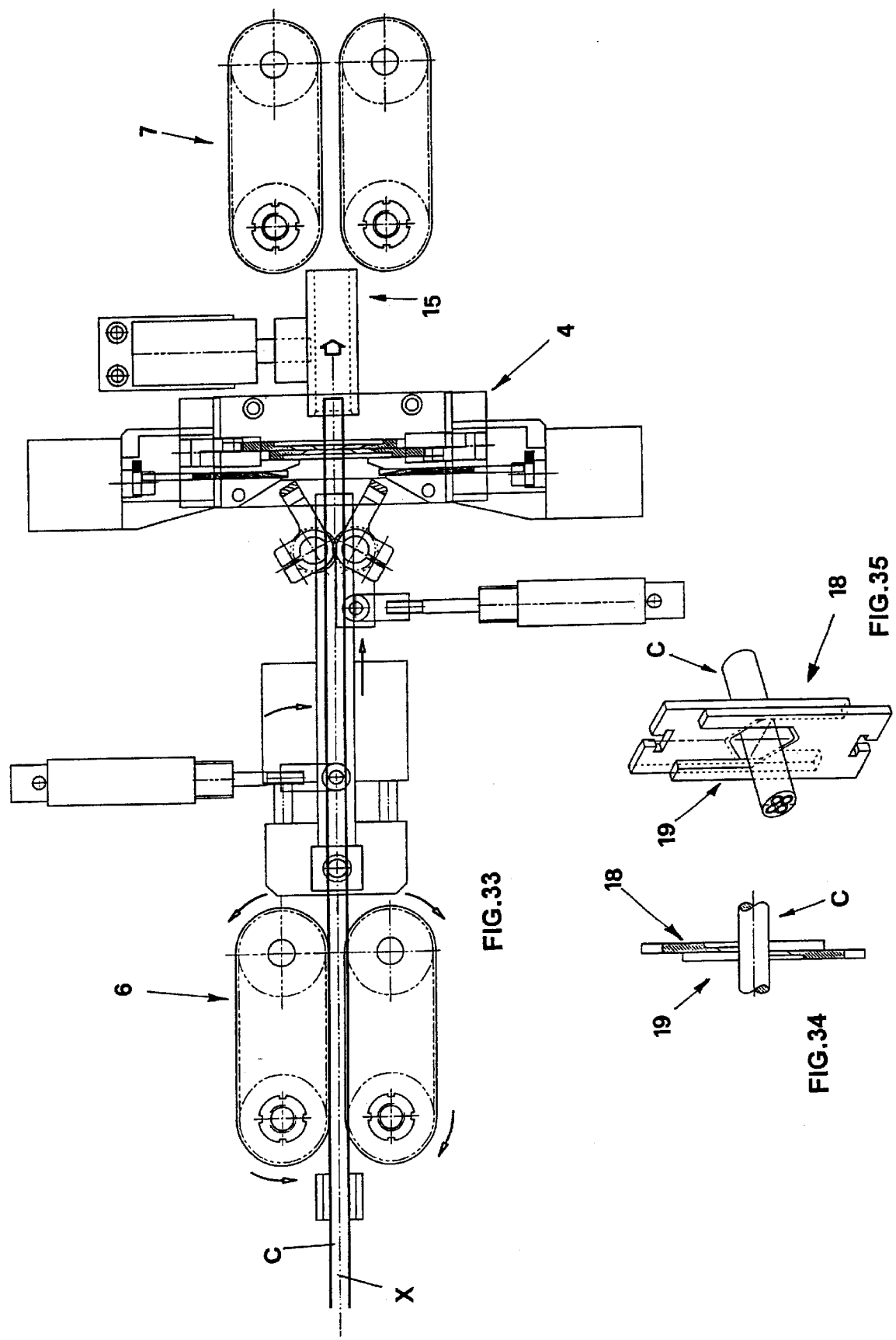

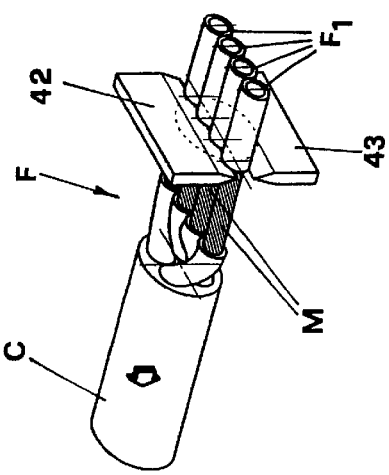
FIG. 41
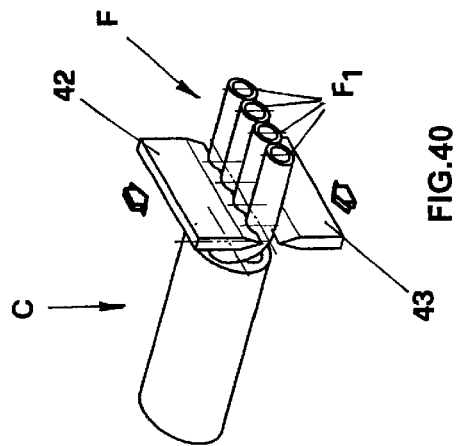
FIG. 40
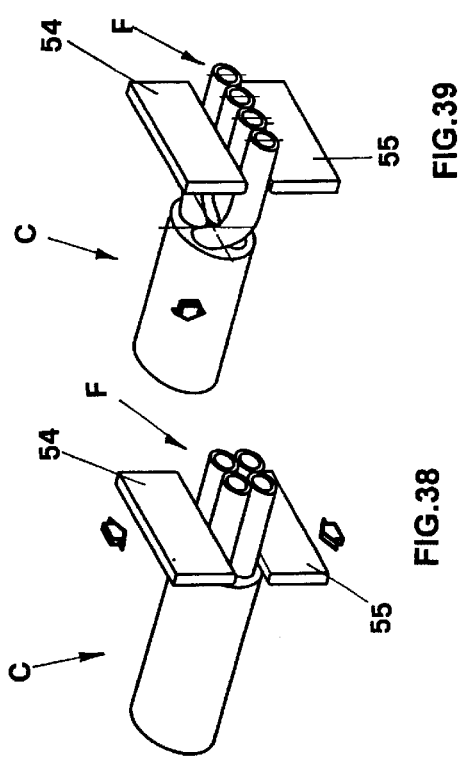
FIG. 39
FIG. 38

SHEARING-STRIPPING MACHINE FOR ELECTRIC CABLES

The present invention relates to a shearing-stripping machine for electric cables.

It is well known that for shearing electric cables into sections of different length and stripping their ends and the possible wires constituting the cables, shearing-stripping machines are used, carrying out said operations starting from cables of indefinite length wound as a coil.

The working method generally provides for unwinding the cable from the coil and introducing it through suitable advancement devices into a shearing and stripping unit where the cable is firstly shorn to the desired length and then stripped at the ends.

When the cable comprises more wires, these wires may also be stripped for a determined stretch so as to uncover the conductors.

The above mentioned shearing-stripping machines of known type available on the market generally comprise one or more cable driving units and one or more shearing and stripping units, the latter being provided with opposite movable blades for shearing the cable and stripping its ends and possibly also the ends of each wire of the cable.

The shearing-stripping machines carrying out also stripping of the wires, in addition to the cable shearing and stripping unit, comprise also an alignment unit provided with opposite aligning jaws to place the wires juxtaposed to each other on an almost horizontal plane and opposite blades incising the sheaths and carrying out stripping of the wires after their alignment.

In such machines of the prior art the aligning jaws and the stripping blades are supported by suitable sliding units and are put in motion by suitable driving means moving them along a rectilinear direction generally orthogonal to the cable advancement direction.

In the above mentioned machines of the prior art, the stripping blades for the cable and the wires are juxtaposed on a generally vertical plane perpendicular to the cable advancement direction. Both blades are put in the working position by a first driving unit provided with an electric motor with electronic motion control, while a second driving unit also provided with electric motor with electronic motion control, move the blades in opposite directions to carry out incision and stripping.

Such machines, therefore, have the drawback of having high construction costs in view of the presence of two driving units each provided with a motor with electronic motion control and corresponding software.

Another drawback consists in that the presence of two motors involves greater difficulty of regulation and greater need of maintenance together with a lower reliability of operation.

A further drawback arises from the fact that the wire aligning jaws are independent from each other and each jaw is driven by a pneumatic actuator. Indeed, the independent pneumatic control on the jaws does not warrant the precise co-ordination of the movements of said jaws and consequently does not warrant that the wires are always aligned on the same generally horizontal plane. Consequently, during the wire stripping stage the blades could incise besides the sheaths also the conductors so as to damage the conductors and wear the blades.

The present invention aims at overcoming said drawback.

More particularly, a first object of the invention is to provide a shearing-stripping machine wherein the means for driving and controlling the movement of the stripping blades are of simpler construction in comparison of the known types.

Another object of the invention is to provide a shearing-stripping machine in which there is a unit for aligning the wires to be stripped having a self-centering effect on the wires so as to place them always aligned and coplanar during incision of the sheaths.

A further object of the invention is to provide a machine which is more reliable and less expensive to be constructed in comparison with the machines of the prior art.

Said objects are attained with a shearing-stripping machine for electric cables that according to the main claim comprises a casing on which the following elements are mounted: driving means to advance said cable to be shorn and stripped; at least a shearing and stripping unit comprising a blade guide body provided with first blades supported by first blade holders for shearing the cable, incising the sheath and stripping said cable and second blades for incising the sheaths of the wires of the cable and stripping said wires; at least an alignment unit of said wires adapted to place said wires juxtaposed and coplanar before incision of said sheaths by said second blades; first driving means for the movement of said first blades; second driving means for the movement of said second blades; at least a microprocessor unit controlling and actuating said driving means and said driving units, wherein said first driving means comprise a single motor coupled to a mechanism to which adjustable stop means for the stroke of said second blades are associated.

In this way with the same motor carrying out the movement of said first shearing and stripping blades, the control of the movement of the second stripping blades is obtained as well.

The motor is preferably an electric motor with electronic rotation control.

According to the preferred embodiment that will be described hereinafter, the mechanism comprises a screw coupled to the shaft of said single motor, said screw having opposite right-hand and left-hand threads coupled with corresponding screw nuts with which the adjustable stop means of the stroke of the second stripping blades are associated, which consist of the same first blade holders supporting the first shearing and stripping blades.

In this way the number of motors is advantageously reduced in comparison with those used to make equivalent machines of the prior art, to the advantage of a greater reliability of the machine and lower construction costs.

The foregoing objects and advantages will be better understood by reading the following description of a preferred embodiment of the invention which is given as an illustrative but non limiting example with reference to the accompanying sheets of drawings in which:

FIG. 3 is a view of part of the machine shown in FIG. 1;

FIG. 4 is an enlarged view of the shearing and stripping blades of the machine of the invention;

FIGS. 5 and 6 are two different views of the shearing and slipping blades of FIG. 4 in the operative position;

FIG. 7 is a cross sectional view of the machine of the invention, when shearing the cable;

FIGS. 8 to 10 show the mutual positions of the blades of the machine shown in FIG. 7.

FIGS. 14 to 16 show different positions of the shearing and stripping blades during the stage of incising the cable sheath;

FIG. 17 shows the machine of FIG. 11 during the cable stripping stage;

FIGS. 18 to 20 show the detail of the blades of the machine of FIG. 17 during the stripping operation;

FIGS. 23 to 26 show details of the machine of FIG. 21 in the operative stage;

FIG. 27 is another cross sectional view of the machine of FIG. 1;

FIG. 28 shows a detail of the machine of the invention during the incision of the wire sheaths;

FIGS. 29 and 30 are two different views of the blades during incision of the sheaths of the cable wires;

FIG. 31 is a detail of the machine of FIG. 22 during the wire stripping stage;

FIG. 32 shows the detail of the blades of the machine of FIG. 31 during stripping of the cable wires;

FIG. 33 shows the machine of FIG. 17 during another working stage;

FIGS. 34 and 35 show details of the shearing and stripping blades of the machine of FIG. 33;

FIG. 38 shows the wire aligning phase;

FIG. 39 shows the aligned wires;

FIG. 40 shows incision of the wire covering sheaths;

FIG. 41 shows the wire stripping;

Figure 1:
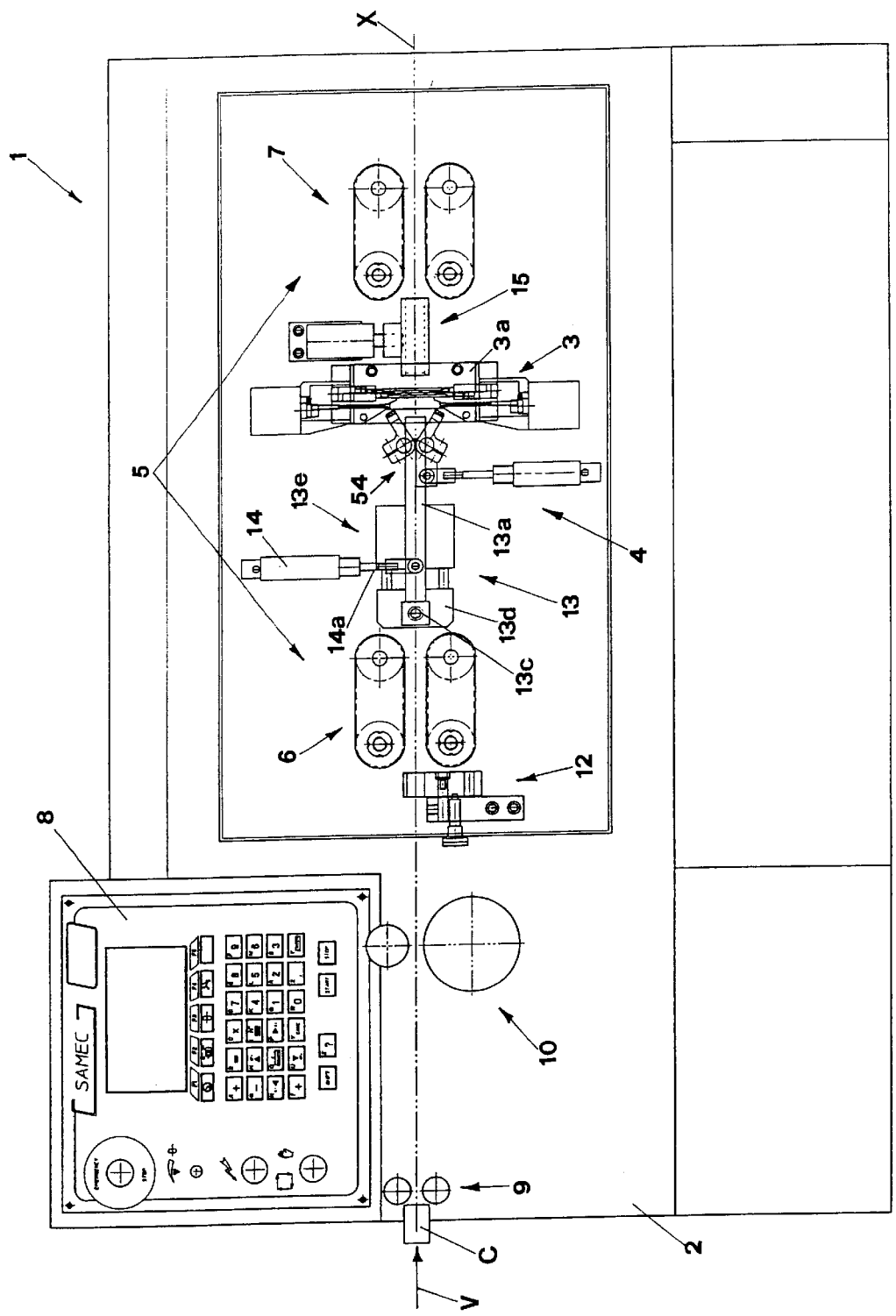
FIG. 1 is a front view of the machine of the invention.
Figure 2:
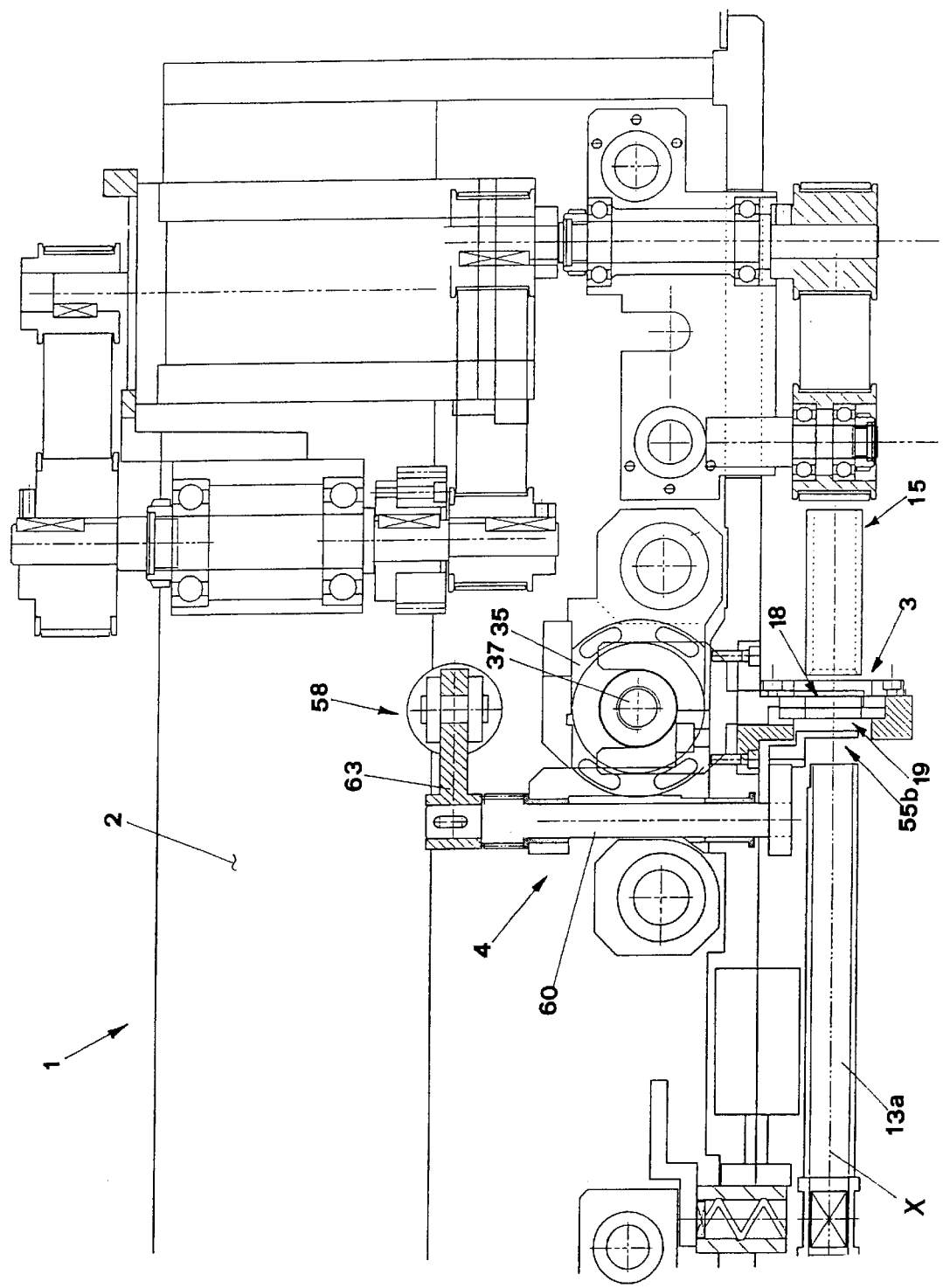
FIG. 2 is a top view of a part of the machine of the invention.

The shearing-stripping machine subject of the present invention is generally shown in FIG. 1 and partially also in FIG. 2 where it is generally indicated with reference numeral 1.

One can see that the machine comprises a casing 2 on which the following elements are mounted: driving means generally indicated with numeral 5 adapted to advance cable C along a longitudinal direction X in the way indicated by arrow V; a unit generally indicated with numeral 3 for shearing the cable C and stripping both the cable C and the wires F constituting the cable; an alignment unit for the wires F generally indicated with numeral 4 and arranged upstream the shearing and stripping unit 3 to arrange the wires aligned on a generally horizontal plane one aside the other before the stripping operation; a microprocessor unit generally indicated with numeral 8 controlling and actuating the advancement, shearing and stripping operations.

More particularly, the driving means 5 comprise a first driving unit generally indicated with numeral 6 advancing the cable C to the alignment unit 4; and a second driving unit generally indicated with numeral 7 moving the cable C away from the shearing and stripping unit.

The shearing-stripping machine comprises also a cable guiding roller inlet 9 followed by a gauging unit 10 arranged upstream the first driving unit 6.

Downstream the gauging unit 10 and just upstream the first driving unit 6 there is an inlet cable guide 12 while immediately downstream the first driving unit 6 there is an intermediate cable guide 13.

The intermediate cable guide 13 comprises a tubular member 13*a* having an end 13*b* pivoted through a pin 13*c* to the movable member 13*d* of a first actuator 13 fixed to the machine casing 2.

A second actuator 14 also fixed to the casing 2 of the machine, has the movable member 14*a* connected in an intermediate position to the tubular member 13*a*.

Therefore, the tubular member 13*a* through the actuators 13 and 14 may be translated horizontally and also rotated on the pin 13*c*.

An outlet cable guide 15 is arranged between the shearing and stripping unit 3 and the second driving unit 7.

With regard now to the shearing and stripping unit 3 that can be seen in greater detail also in FIGS. 3, 7, 11 and 17, one can see that it comprises a blade guiding body 3*a* provided with two first blades 18, 19 for shearing the cable C and incising the outer sheath C1 covering the cable, as shown more particularly in FIGS. 4 to 6, 8 to 10, 12 to 16 and 18 to 20, and two second blades 42, 43 more particularly the sheaths F1 covering the wires F constituting the cable C.

With reference more particularly to FIGS. 4 and 5, the first blades 18, 19 consist of a couple of plates 20, 21 with planar surfaces 20*a*, 21*a* closely juxtaposed one to the other, each plate being provided with a cutting element 22, 23 defined by the sharp edge 24, 25. The cable C to be shorn and stripped is arranged between the sharp edges 22, 23 of said blades properly spaced from each other.

Each of said first blades 18, 19 is supported by the first blade holder 32, 33 respectively to be seen more particularly in FIG. 7, each blade holder being in term coupled to first driving means generally indicated with 34 for moving the blades 18, 19.

According to the invention said first driving means 34 comprise a single motor 35 whose driving shaft 36 is connected to a mechanism generally indicated with numeral 34*a* to which adjustable stop means 80, 81 of the stroke of the second blades 42, 43 are associated.

Preferably, said single motor 35 is an electric motor with electronic rotation control. As shown in FIG. 7 the mechanism 34*a* comprises a screw 37 coupled to the shaft 36 of the electric motor 35 and provided with opposite right-hand thread 37*b* and left-hand thread 37*a* coupled with corresponding screw nuts 38, 39 to which adjustable stop means 80, 81 of the stroke of the second blades 42, 43 are associated.

Therefore, the blades 18, 19 can move along the directions indicated by axis Ya, Yb in the opposite ways indicated by arrows 40*a*, 40*b* according to the rotation direction of motor 35.

Figure 45:
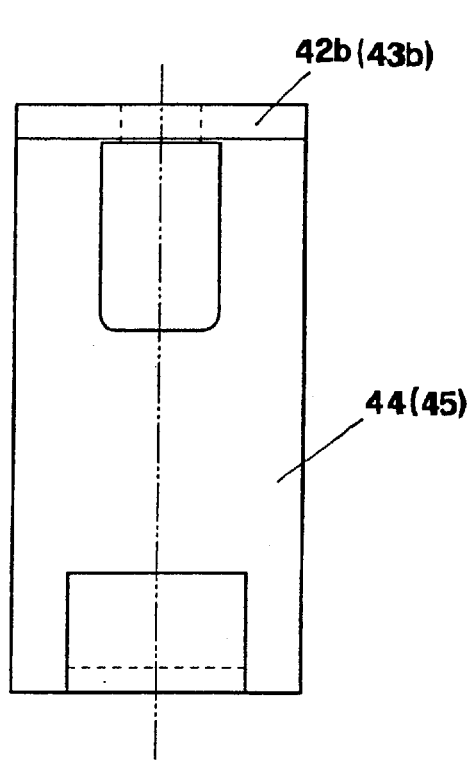
FIGS. 44 to 46 are different views of the wire stripping blades.
Figure 46:
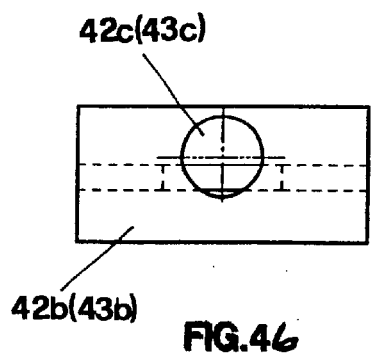
Figure 47:
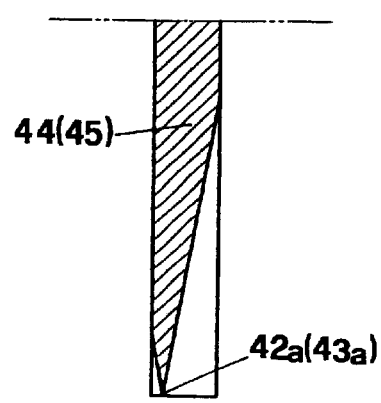
FIG. 47 is a detail of FIG. 44.

The adjustable means stop means 80, 81 of the stroke of the second blades 42, 43 are constituted by the same first blade holders 32, 33, each of them acting as a stop element for a corresponding shaped head 42*b*, 43*b*, belonging to each second blade 42, 43 to be seen in FIGS. 45 to 47 as will be described in more detail hereinafter.

The second blades 42, 43 can be seen in detail in FIGS. 17, 21, 22, 28 and 31 and still in grater detail in FIGS. 45 to 48 where one can see that the blades consist of a couple of plates 44, 45 vertically aligned to each other and provided with opposite rectilinear cutting edges 42*a*, 43*a* for incising the sheaths F1 covering each wire F.

Figure 21:
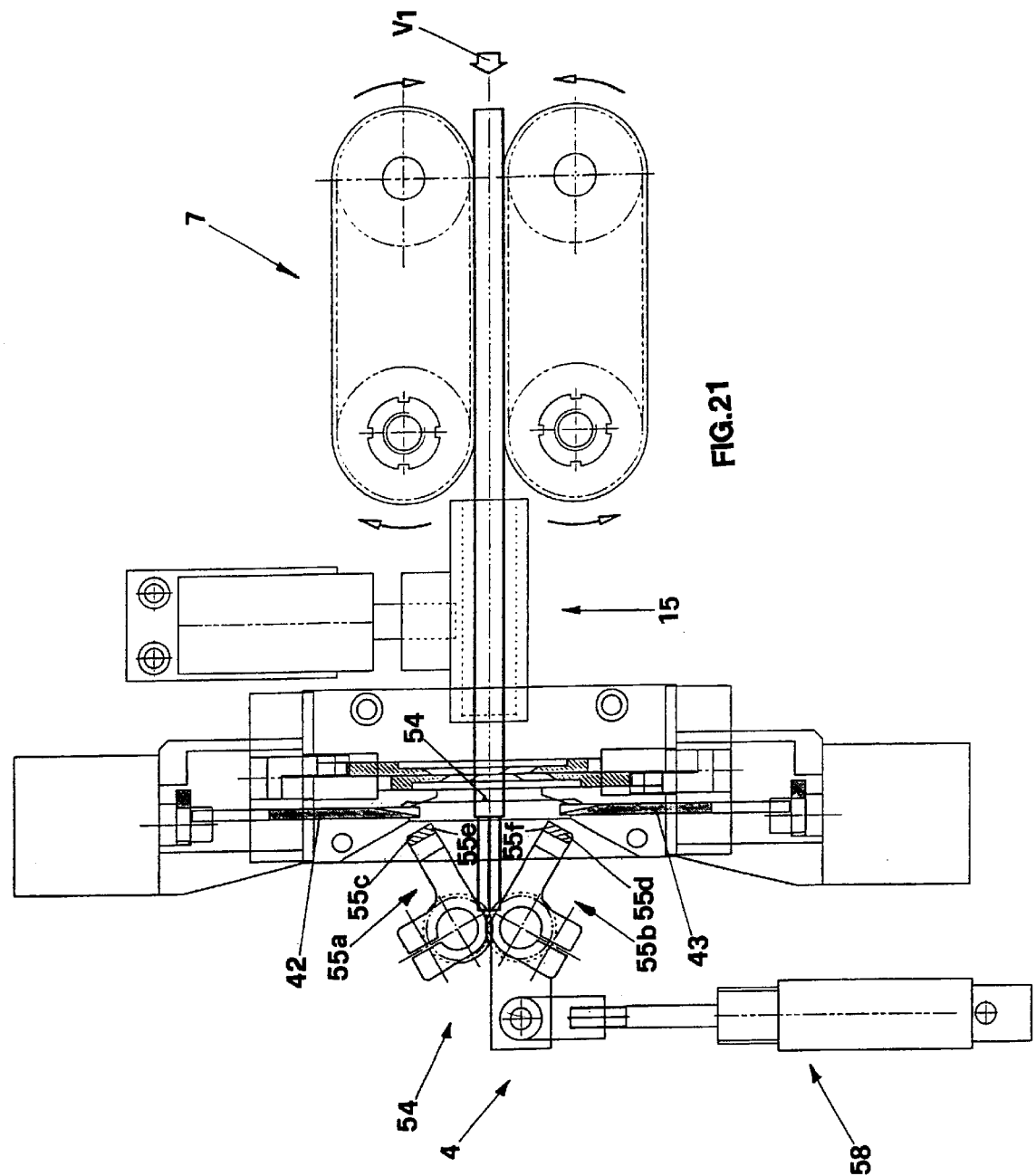
FIGS. 21 and 22 show a detail of the machine of FIG. 17 in two different operative stages.

At the opposite part relative to the cutting edge, each second blade has the above mentioned shaped head 42*b*, 43*b* with a hole 42*c*, 43*c* for connection to second driving means 52 shown in FIG. 21 adapted to move the blade in the same vertical direction of the first blades 18, 19 along the opposite ways indicated by arrows 40*a* or 40*b*.

Said second driving means 52 consist of a couple of fluidic actuators 52*a*, 52*b* supported by the blade guiding body 3*a* and having the rods 52*c*, 52*d* each connected to a corresponding shaped head 42*b*, 43*b* of a second blade 42, 43.

With regard now to the alignment unit 4 for the wires F constituting the cable C, said unit is arranged upstream the shearing and stripping unit 3 as shown in FIG. 21 and is provided with an aligning chuck 54 to place the wires F coplanar and juxtaposed to each other before incising their sheaths.

The aligning chuck comprises two aligning jaws 55a, 55b, each jaw being supported by a rotation pin 59, 60 supported by the machine casing 2.

A pinion gear 61, 62 is associated to each of said rotation pins 59, 60 and one of said pins, for instance the lower rotation pin 60 is in its turn associated to third driving means through a connecting rod 63.

Said third driving means consist of a fluidic actuator 58 of commercial type available on the market, whose rod 58a has the end 58b pivoted to the connecting rod 63 for connection to the lower pin 60.

Movement of the rod 58a gives to the jaws 55a, 55b of the aligning chuck 54 opposite rotation movements around the corresponding pins 59, 60 because the pinion gears 61, 62 are mutually engaged and therefore the rotation given by the actuator 58 to the lower pins 60 is transmitted also to the upper pin 61.

Preferably but not necessarily the aligning jaws 55a, 55b as shown in FIGS. 23 and 24 comprise shaped blades 55c, 55d having opposite planar surfaces 55e, 55f in contact with the wires F constituting the cable C.

The jaws 55a, 55b, as shown more particularly in FIGS. 24 and 26, have the function to align the wires F juxtaposing them to each other on the same plane, before incising their sheaths F1 to the second blades 42, 43.

In this way a perfect incision of the sheaths by the second blades 42, 43 is warranted and the risk that the blades incise also the metal wire because of a misalignment of the wires F is prevented.

As to the position of the second blades 42, 43 and more particularly, penetration of their cutting edges 42a, 43a into the sheaths F1 of the wires F, such penetration is set through adjustable stop means generally indicated with 80, 81 and to be seen particularly in FIGS. 27 and 28, consisting of each first blade holder 33, 32 acting as stop for the corresponding shaped head 42b, 43b of a corresponding second blade 42, 43.

In such a way control of penetration of the cutting edges 42a, 43a of the second blades 42, 43 into the sheaths F1 occurs using the same first blade holder 33, 32 of the first blades 18, 19 and also the same electric motor 35 carrying out movement of the first blade holders 33, 32.

Indeed, the microprocessor unit 8 controlling rotation of the motor 34 allows to vary the vertical stroke of the second blades 42, 43 changing the position of the first blade holders 33, 32 and therefore the point of contact with the shaped heads 42b, 43b and consequently, the penetration of the second blades 42, 43 into the sheaths F1 to be incised according to their thickness.

Figure 43:
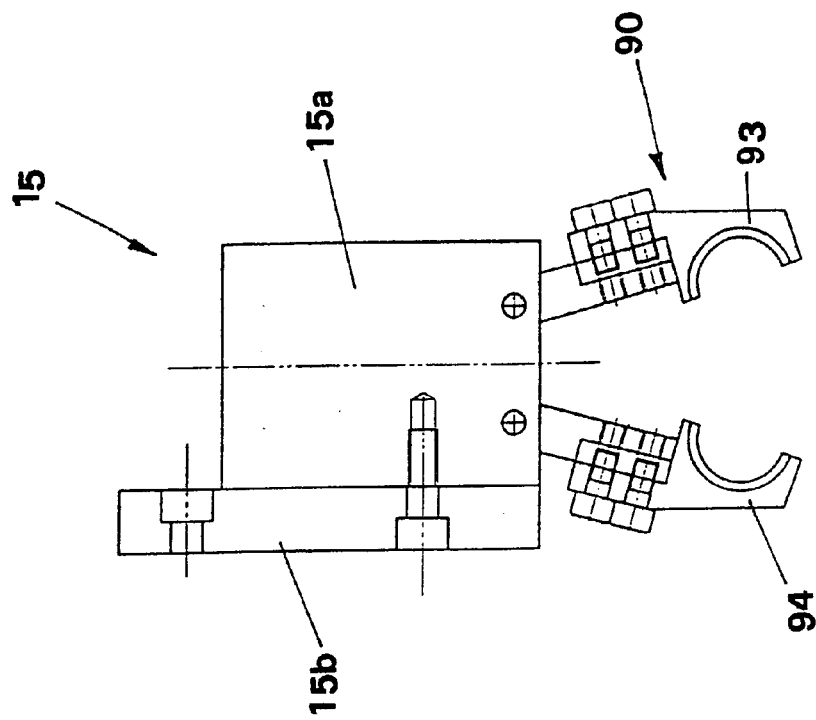
FIGS. 42 and 43 are two different views of the outlet cable guide.
Figure 44:
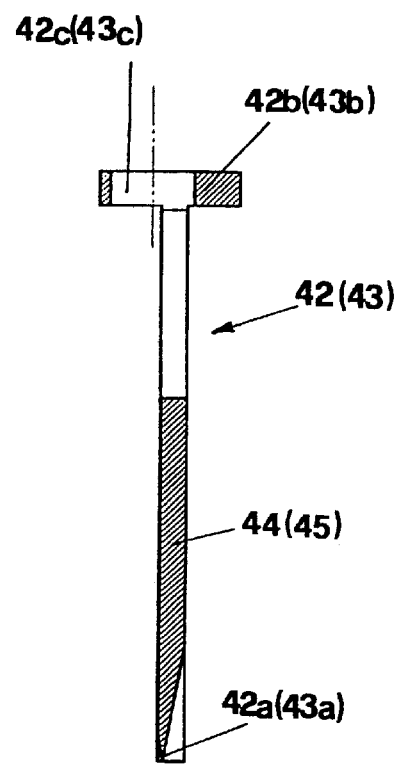

Finally, as to the outlet cable guide 15 shown in greater detail in FIGS. 43 and 44 illustrating its closed and open position respectively, it consist of an actuator 15a fixed through a connection flange 15b to the machine casing and controlling opening and closing of a gripping chuck generally indicated with 90 and consisting of a couple of jaws, 91, 92 with opposite shaped ends 93, 94. These ends when arranged in the closed position shown in FIG. 43, define a hole 95 accommodating the cable C.

In operation the cable C to be shorn to size and stripped, is introduced at the cable guiding roller inlet 9 and is advanced along the direction indicated by arrow V by the driving units 6 and 7.

The gauging unit 10 detects the length of cable C set in the controlling and actuating microprocessor unit 8 and stops its advancement when reaching the desired shearing length.

This occurs when along the advancement direction V the desired length of cable is protruding from the shearing and stripping unit 3.

In such a position as shown also in FIGS. 5 and 6, the cable C is arranged between the first shearing and stripping blades 18, 19 ready to undergo the shearing operation when the control and actuation unit 8 on the basis of a set program, actuates the motor 35. Said motor 35 moves the blades 18, 19 according to the opposite directions indicated by arrows 70, 71 in FIG. 9, bringing the cutting edges 22, 23 close to the cable along the movement axis Y until it is shorn.

Figure 13:
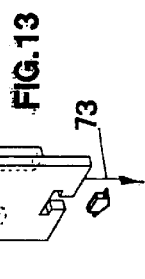
FIGS. 12 and 13 are different views of the shearing and stripping blades of the machine of FIG. 11.
Figure 12:
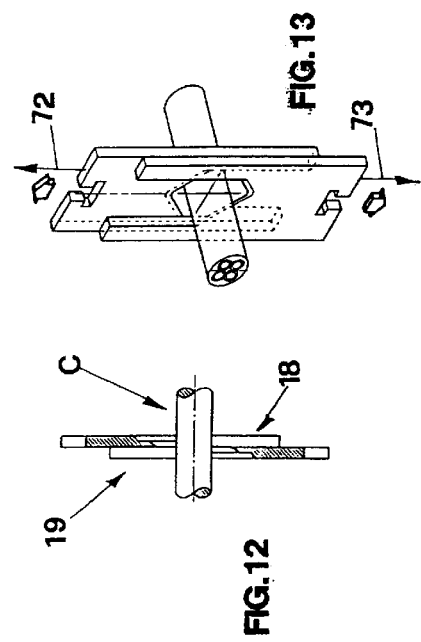

At this point the intermediate cable guide 13 is lifted as shown in FIG. 17 while the first blades 18, 19, as shown in FIGS. 12 and 13, invert their mutual movement to return to the configuration in which they allow passage of cable C between them.

Figure 11:
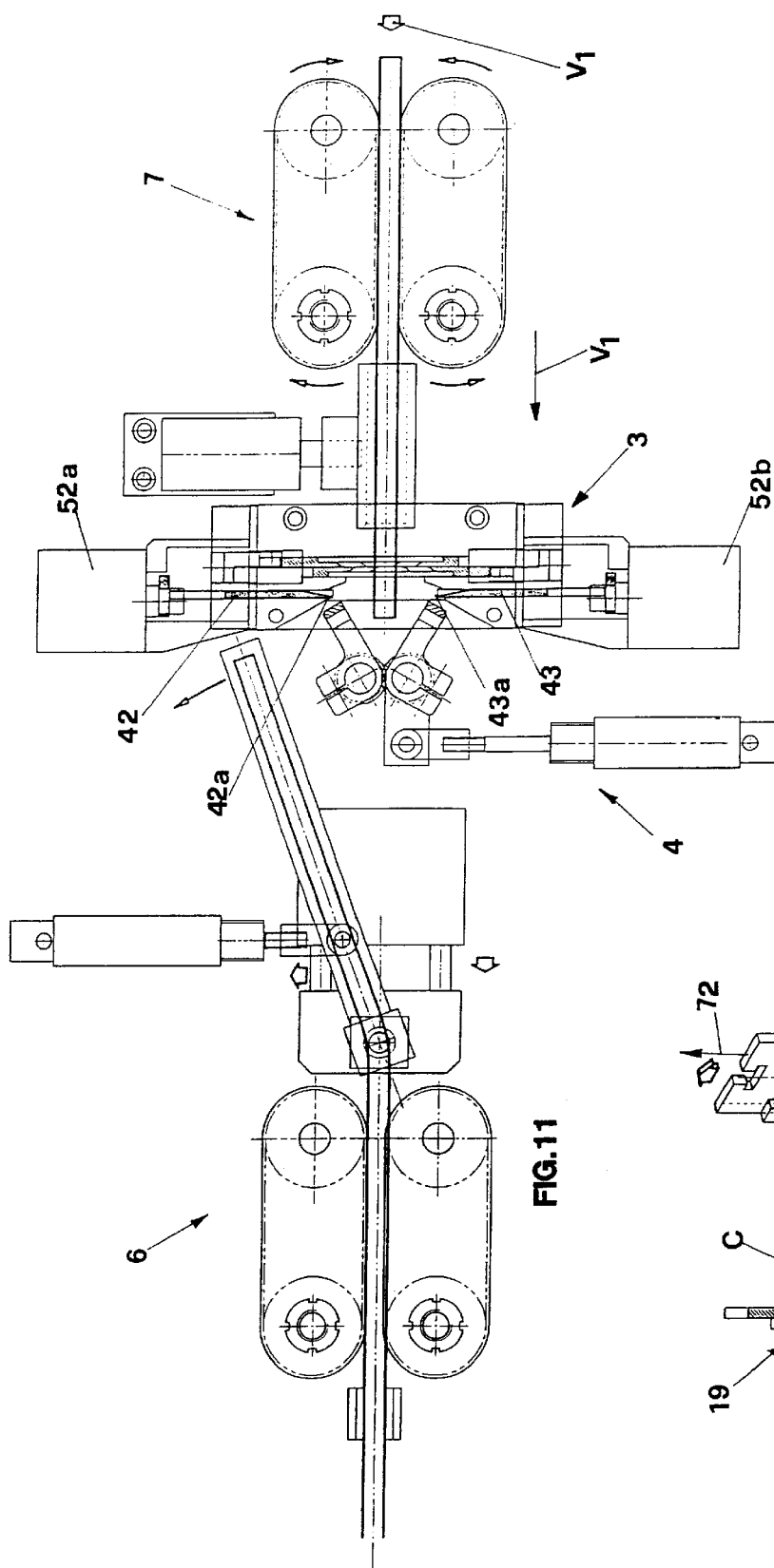
FIG. 11 shows the machine of FIG. 3 in a different operative stage.

The cable C is then retracted in the direction indicated by arrow V1 in FIG. 11 for a stretch equal to the stripping length so as to place the cable end under the shearing and stripping unit 3 to carry out incision of the sheaths covering said cable.

The blades 18, 19 are then moved along the opposite directions indicated by arrows 70, 71 until they are arranged in the position shown in FIGS. 14 to 16 where the sharp edges 24, 25 of the cutting rims 22, 23 of both blades penetrate into the sheath C1 for an amount sufficient to incise circumferentially at least for a portion.

The microprocessor unit controls rotation of the motor 35 that through the coupling of screw 37 and corresponding screw 36, 39 causes the blades 18, 19 to move for a controlled amount so as to regulate also the depth of penetration of the blades into the sheath as a function of its thickness.

After the sheath incision, the second driving unit 7 inverts movement of cable C causing it to advance again in the direction indicated by arrow V, so as to obtain separation of the sheath C1 by contrast against the first blades 18, 19 as shown more particularly in FIGS. 18, 19 and 20.

To proceed to stripping the wires F, the second driving unit 7, as shown in FIG. 21, inverts again the rotation of the belts 7a, 7b so that the cable C is again retracted along the direction indicated by arrow V1 to place the wires F under the second cutting blades 42, 43 and the aligning jaws 54, 55 as shown in FIG. 21.

Figure 22:
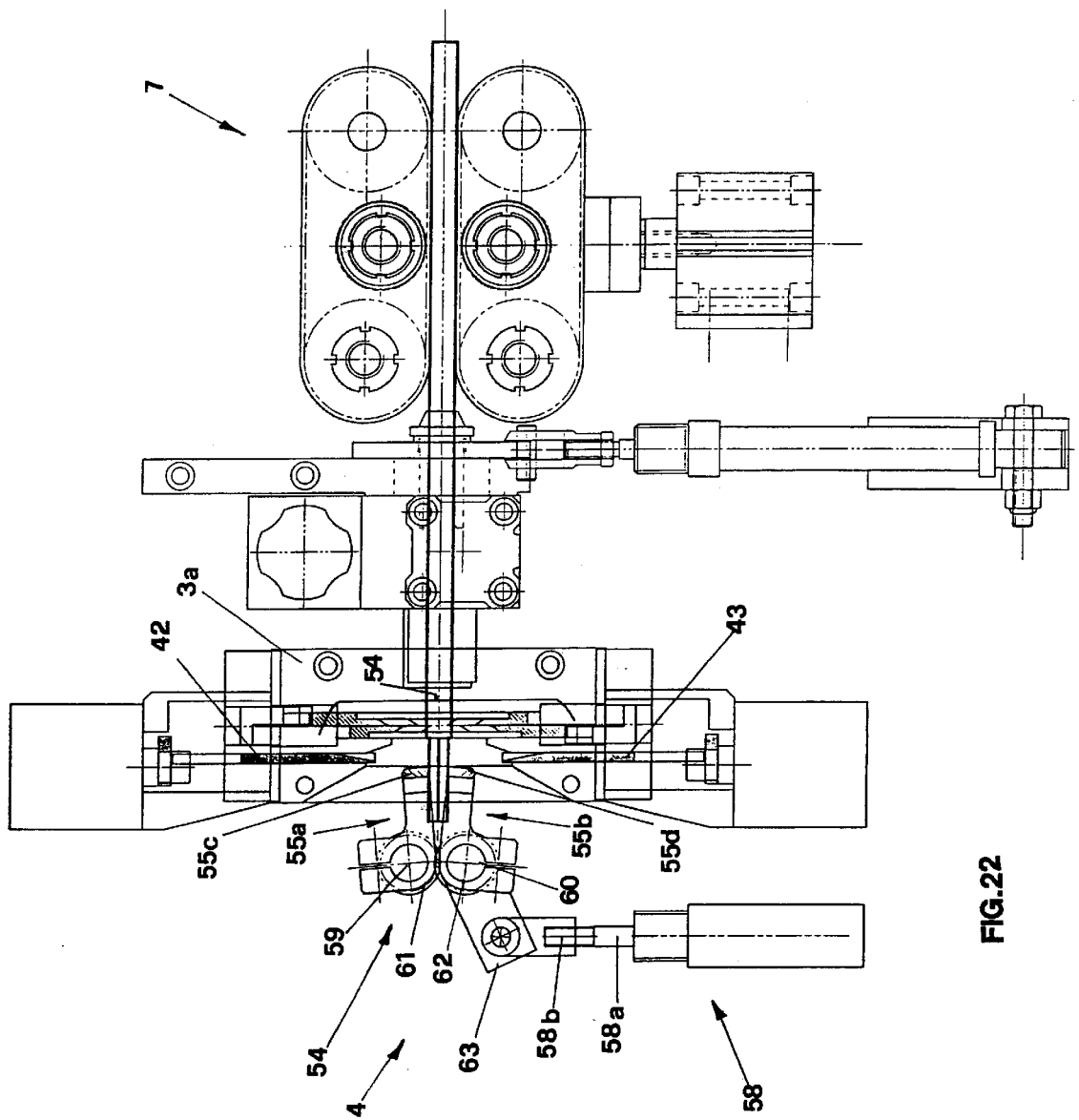

At this point a control imparted by the control and actuation unit 8 causes the aligning chuck 54 to close whose jaws 55a, 55b are arranged against the wires F in the position shown in FIG. 22.

If the wires F are arranged in the superimposed position shown in FIG. 24, by acting on the second driving unit 7, the cable C is again advanced along the direction indicated by arrow V in FIGS. 25 and 26 and pressure of the jaws 55a, 55b causes the wires F to be arranged on a single plane as shown in FIG. 26.

The self-centering effect of the opposite rotation motion of the aligning jaws 55a, 55b constituting the aligning chuck 54, warrants alignment of the wires F always on the same plane.

At this point by actuating the actuators 52a, 52b, the second blades, 42, 43 incise the sheaths F1 as shown in FIGS. 28, 29 and 30 and their penetration into the sheaths F1 is regulated by the position of the contact elements of the shaped heads 42b, 43b of the second blades 42, 43 with the first blade holders 32, 33 imposed by the motor 35.

By inverting again the advancement of the cable C along the direction of arrow V, separation of the sheaths F1 of wires F by contrast against the second blades 42, 43 is obtained as shown also in the detail of FIG. 32.

In this way the conductors M constituting each wire F of the cable C are uncovered.

Figure 37:
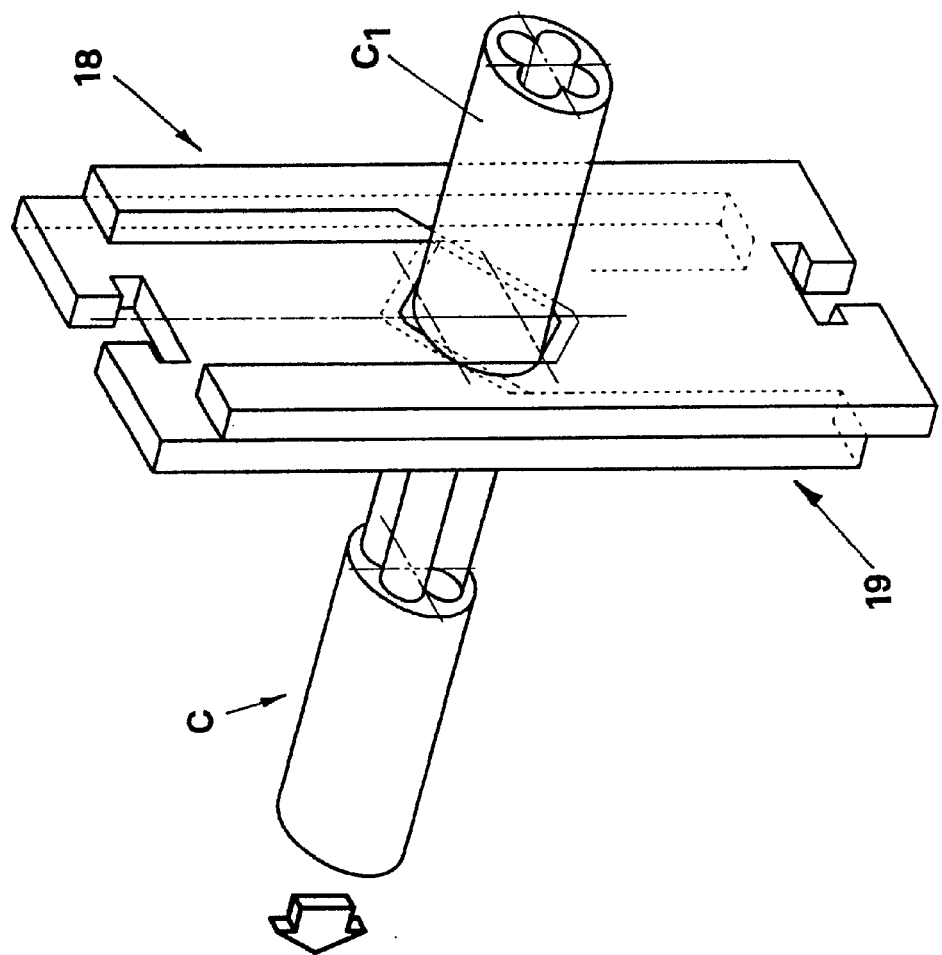
FIG. 37 is an enlarged view of the cable stripping stage.
Figure 36:
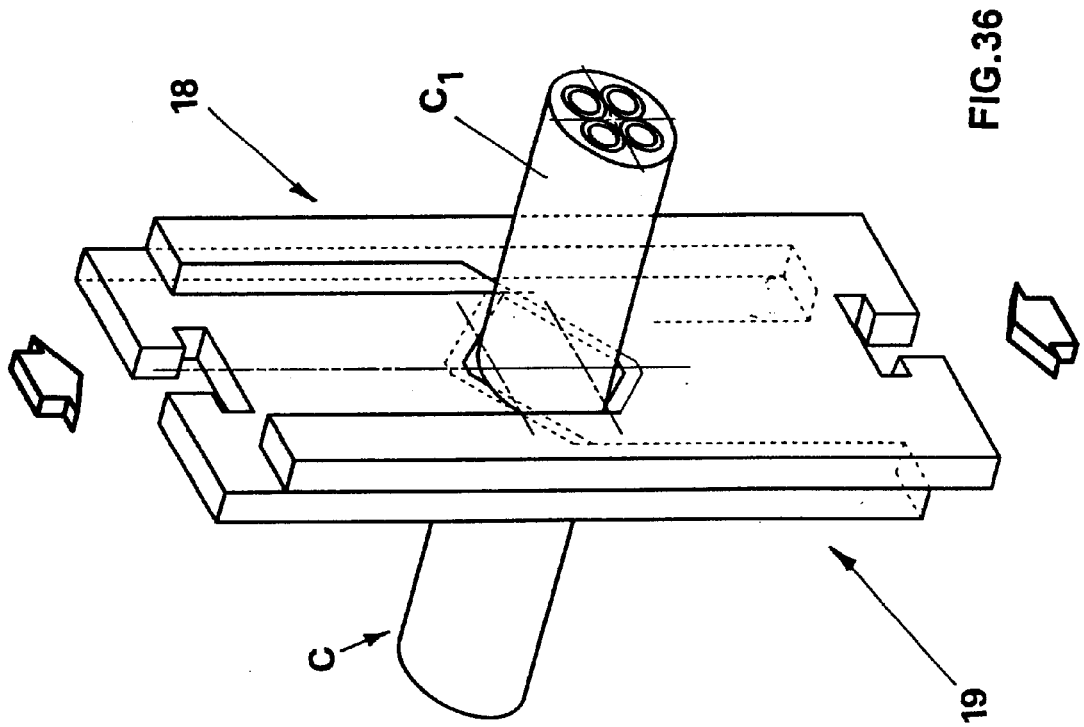
FIG. 36 is an enlarged view of the incision stage of the cable sheath.

In order to proceed to strip the end of the cable C kept inside the intermediate cable guide 13, the cable guide is arranged aligned along axis X as shown in FIG. 33 and through the driving unit 6 the cable C is advanced until the end to be shorn is places under the action of the sharing and stripping unit 3. Proceeding exactly according to the same previously described sequence and starting from the configuration shown in FIGS. 34 and 35, through the movement of the first blades 18, 19 incision of the sheaths C1 of cable C is carried out as shown in FIG. 36, followed by its stripping with separation of the sheath C1 a shown in FIG. 37.

Figure 42:
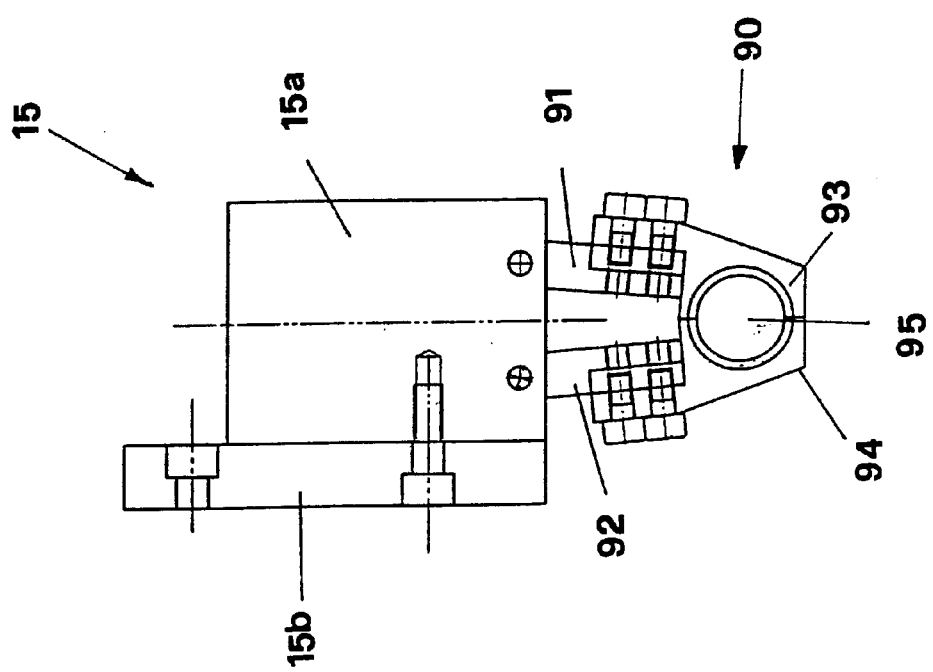

In order to strip the wires F one proceeds in the previously described way, firstly aligning the wires as shown in the details of FIGS. 39 and 42, then incising their sheaths as shown in FIG. 40 and then stripping them as shown in FIG. 41.

The stretch of stripped cable is then discharged by movement in the direction of the arrow V given by the second driving unit 7, or by opening the gripping chuck 90.

In view of the foregoing one can understand that the described machine carries out the method of shearing and stripping electric cables and attains all the previously mentioned objects.

It is clear that in the executive stage many modification could be made to the method and the shearing stripping machine carrying out said method, that should be considered all covered by the present invention when falling within the scope of the appended claims.

What is claimed is:

1. A shearing-stripping for electric cables comprising:
   a casing on which the following elements are mounted:
      driving means to advance said cables to be shorn and stripped;
      a shearing and stripping unit comprising a blade guiding body provided with first blades supported by first blade holders for shearing the cable, incising the sheath and stripping said cable and second blades having an adjustable stroke for incising the sheath of wires in said cable and stripping said wires;
      an aligning unit adapted to place said wires juxtaposed and coplanar to each other before incision of said sheaths by said second blades;
      first driving means including a motor for moving said first blades;
      second driving means for moving said second blades, said second blades having an adjustable stop for varying the stroke thereof including first blade holders, each cooperating by contact with a corresponding shaped head provided in each of said second blades;
   a control and actuation microprocessor unit for said driving means and said driving units; and
   a mechanism coupled to the motor associated with the adjustable stop.

2. The machine according to claim 1 wherein said mechanism comprises a screw coupled to the shaft of the motor, said screw being provided with opposite right-hand and left-hand threads coupled with corresponding screw nuts associated with said adjustable stop.

3. The machine according to claim 1 wherein said alignment unit is arranged upstream said shearing and stripping unit and comprises an aligning chuck including a pair of aligning jaws, each jaw being supported by a corresponding rotation pain, at least one of said rotation pins being connected to third driving means, both pins cooperating with each other through corresponding pinion gears engaged one each with said rotation pins respectively.

4. The machine according to claim 3 wherein said aligning jaws comprise opposite shaped plates having planar surfaces adapted to be put in contact at the opposite sides with the wires forming said cable.

5. The machine according to claim 1 wherein said second driving means comprises pneumatic actuators each connected to one of said second blades and both supported by said blade guiding body.

6. The machine according to claim 1 wherein said second blades are arranged on opposite sides relative to said cable and have end portions formed with a rectilinear sharp edge.

7. The machine according to claim 1 wherein said driving means for said cable comprises a first driving unit arranged upstream of said aligning unit and a second driving unit arranged downstream of said shearing and stripping unit, said driving units being adapted to advance said cable along generally rectilinear directions.

8. The machine according to claim 7 wherein a cable guide roller inlet is arranged upstream of said first driving unit.

9. The machine according to claim 8 wherein a gauging unit for measuring the length of said cable is arranged between said cable guide roller inlet and said first driving unit.

10. The machine according to claim 9 wherein an inlet cable guide is arranged downstream of said gauging unit and upstream of said first driving unit.

11. The machine according to claim 7 wherein an intermediate cable guide is arranged between said first driving unit and said alignment unit.

12. The machine according to claim 11 wherein said intermediate cable guide comprises a tubular member having an end pivoted through a pin to the movable member of a first actuator fixed to the casing of said machine.

13. The machine according to claim 7 wherein an outlet cable guide is arranged downstream of said shearing and stripping unit and upstream of said second driving unit.

14. The machine according to claim 13 wherein said outlet cable guide comprises an actuator fixed to the casing of said machine and provided with a gripping chuck.

15. The machine according to claim 14 wherein said gripping chuck comprises a pair of jaws opposite to each other and mutually movable one to the other with a circular motion, said jaws having shaped ends defining a hole adapted to receive said cable.

16. The machine according to claim 1 wherein said second driving means comprises pneumatic actuators.

17. The machine according to claim 1 wherein said motor comprises an electric motor with electronic motion control.

18. A shearing-stripping machine for electric cables comprising:
   a casing on which the following elements are mounted:
      driving units to advance said cables to be shorn and stripped;
      a shearing and stripping unit comprising a blade guiding body provided with first blades supported by first blade holders for shearing the cable, incising the sheath and stripping said cable and second blades for incising the sheath of wires forming said cable and stripping said wires;
      an aligning unit adapted to place said wires juxtaposed and coplanar to each other before incision of said sheath by said second blades;
      driving means including a motor for moving said first blades; second driving means comprising pneumatic actuators for moving said second blades, said second blades having an adjustable stop and a mechanism coupled to the motor associated the adjustable stop;
   a control and actuation microprocessor unit for controlling said first and second driving means and said driving units.

* * * * *